United States Patent [19]

Hunter

[11] 4,199,795
[45] Apr. 22, 1980

[54] CARTRIDGE RECEIVING AND LOCKING MECHANISM

[75] Inventor: Alexander Hunter, Chalfont, Pa.

[73] Assignee: Transaction Management, Inc., Montgomeryville, Pa.

[21] Appl. No.: 918,950

[22] Filed: Jun. 29, 1978

[51] Int. Cl.² ............................................. G11B 15/00
[52] U.S. Cl. ........................................ 360/93; 360/137
[58] Field of Search ................. 360/90, 92, 93, 95, 360/96, 137; 242/198, 192, 55.19 A

[56] References Cited

U.S. PATENT DOCUMENTS

| | | | |
|---|---|---|---|
| 3,743,299 | 7/1973 | Takashino | 360/96 |
| 3,904,149 | 9/1975 | Suzuki | 242/198 |
| 3,957,225 | 5/1976 | Vogel | 360/96 X |
| 4,107,753 | 8/1978 | Izumikawa | 360/93 X |

FOREIGN PATENT DOCUMENTS

| | | | |
|---|---|---|---|
| 271938 | 6/1969 | Austria | 360/96.5 |
| 47-25365 | 7/1972 | Japan | 360/96 |

Primary Examiner—John H. Wolff

[57] ABSTRACT

This disclosure relates to a tape cartridge receiving and locking mechanism comprised of but three relatively moving parts which collectively function to both receive a magnetic tape cartridge and lock said cartridge into position during the recording and transcription of information therefrom. The combination comprises a table portion upon which the magnetic tape cartridge rides, a generally U shaped rocker arm pivotally mounted on the table, and a relatively straight spring which exerts a biasing force on the rocker arm tending to cause projections on the extremities of the rocker arm to project through cut-out portions of the table and into locking engagement with the cartridge.

1 Claim, 8 Drawing Figures

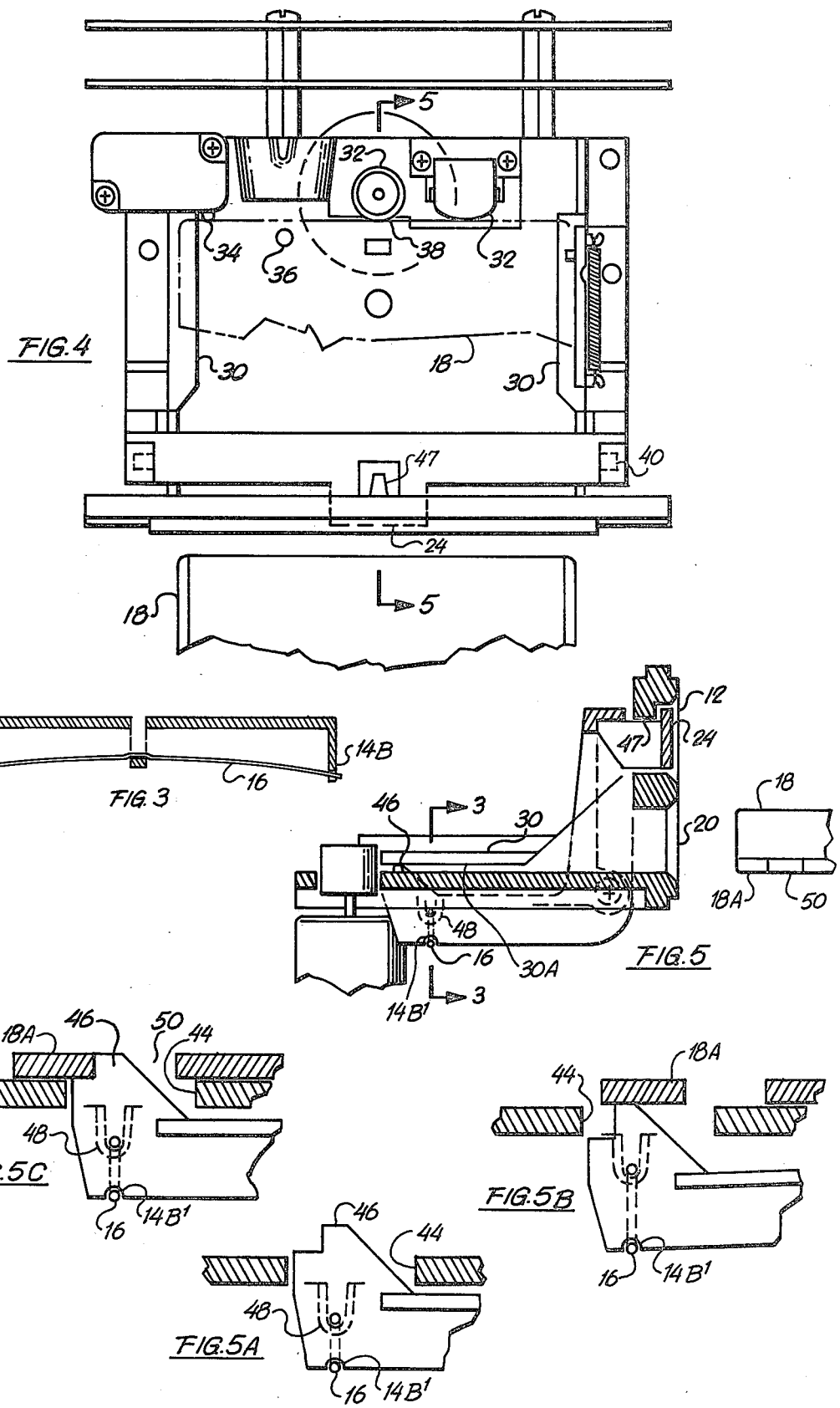

CARTRIDGE RECEIVING AND LOCKING MECHANISM

BACKGROUND OF THE INVENTION

Recording devices of the type employing magnetic tape cartridges for storage and subsequent transmission of data have long been known. In general, such cartridge receiving devices comprise a multiplicity of mechanical components designed to function in an interrelated manner to receive and hold a magnetic tape cartridge during the recording and transcription of information thereon. An example of such prior art devices is embodied in the DGD-1 Data Cartridge Drive manufactured and distributed by the 3M Company. Because of the plurality of components which go to form the mechanical combinations comprising the prior art type cartridge receiving and locking mechanism, substantial costs are incurred in the construction, assembly, and maintenance of such devices. In addition to the added component and construction costs entailed in the prior art type configurations additional factors to be considered before a commitment is made to use such prior art structures include the probable replacement factor and the maintenance costs both of which may be relatively high due to the substantial number of individual components used in the construction.

SUMMARY OF THE INVENTION

In the cartridge receiving and locking mechanism which defines the present invention, an attempt has been made to eliminate all extraneous moveable parts by reducing to a minimum the number of such parts and by combining, in so far as possible, the functions served by each such part, thereby reducing to a minimum the total number of parts required. The result is a simplified structure absent from which are all superfluous and unnecessary parts.

By observing the above set of criteria, it has been found that the function served by the some forty-eight parts comprising the aforementioned 3M cartridge locking and holding mechanism may be substantially reduced. Thus, the function served by independently operating components of the prior art devices are performed by a single component of the present invention which single component is also made to serve a multiplicity of other functions.

By observing the above design criteria, it has been found that the function served by the some forty-eight parts of the prior art type cartridge receiving and locking mechanism can be reduced to merely three relatively movable components.

Not only does the above indicated design criteria result in a significant reduction in the costs of components, but further results in a substantial reduction in the assembly costs and in the learning cycle necessary to familiarize personnel in the assembly and maintenance of the assembly as an operative mechanism.

Other advantages of the present invention will be apparent from the following description when considered in conjunction with the following detailed drawings, which drawings form a part of the specification.

BRIEF DESCRIPTION OF THE DRAWINGS

FIG. 3 is a partial cross-sectional view taken along the line 3—3 of FIG. 5 showing the biasing spring juxtaposed to the rocker arm;

FIG. 4 depicts a plan view of the cartridge receiving and locking mechanism is operative relationship with other components, including a magnetic cartridge and drive and sensing means therefor;

FIG. 5 is a cross-sectional view taken along the line 5—5 of FIG. 4;

FIGS. 5A, 5B, and 5C are partial cross-sectional views taken along the line 5—5 of FIG. 4 showing the locking mechanism at various stages as it is moved into locking position.

DESCRIPTION OF THE INVENTION

Figure 1:
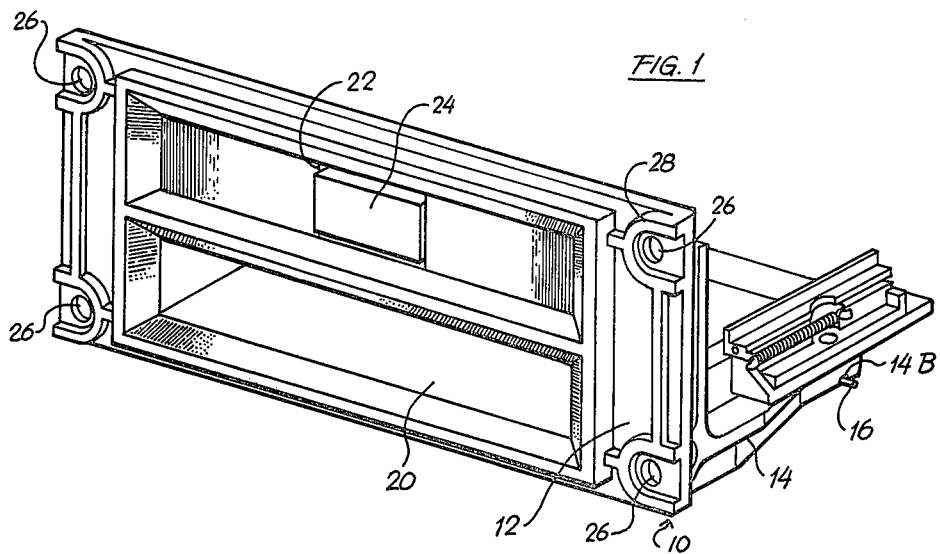
FIG. 1 comprises a front perspective view of the cartridge receiving and locking mechanism.

Referring now to FIGS. 1 through 5, therein is illustrated the preferred embodiment of the cartridge receiving and locking mechanism generally designated 10. The cartridge receiving and locking mechanism 10 consists of three components comprising an integral front plate and table 12, a releasing rocker arm 14, and a relatively straight biasing spring 16.

The front plate and table 12, and the rocker arm 14 are preferably formed of extruded plastic material which in the preferred embodiment of the present invention comprises a polycarbonate material. Such materials are available from a variety of sources, including a commercial composition manufactured by General Electric Company under the trademark LEXAN. Desirable characteristics of polycarbonate for the specific application include the fact that it is a high performance plastic material having good impact strength and stability over a wide temperature range. Further, its electrical properties qualify it as a sole support for current carrying parts. The front plate portion of member 12 is shown as having an opening 20 adapted to receive a magnetic tape cartridge of conventional design such as the 3M's "Scotch" Brand DC 100A Data Cartridge, embodiments of which are described in U.S. Pat. No. 3,692,255.

Above the opening 20 of the front plate portion of member 12 is a cut out portion 22 through which there projects a release button 24, which in turn comprises a portion of the releasing rocker arm 14. Mounting holes 26, partially surrounded by the reinforcing rim 28, are located on each of the four corners of the front plate portion of member 12.

Projecting perpendicular from the front plate portion of member 12 and comprising an integral part thereof is a table portion 12A upon which a magnetic cartridge is supported as it rides into locking position after being inserted through the opening 20. Elongated guides 30 bordering each side of the table 12A restrict relative motion of the cartridge 18 after the cartridge has been inserted through the opening 20. The location and geometric configuration of the guides 30 are defined by the physical parameters of the cartridge 18 as are the positions and geometric configurations of a magnetic sensing and recording head 32, a microswitch assembly 34, a photoelectric emitter 36, and a tape drive motor and capstan assembly 38. Other than as indicated above, components 30, 32, 34, 36, and 38 form no portion of the present invention. Further details of the construction and function of the latter components are to be found in the co-pending application of Alexander Hunter entitled TAPE CARTRIDGE TENSIONING AND EJECTING MECHANISM filed July 24, 1978 under U.S. Ser. No. 926,315.

The releasing rocker arm 14 is pivotally mounted on the front plate and table 12 by means of projections 40 integrally moulded to member 12. The projections 40 cooperate with recesses 42 of the rocker arm 14 thus facilitating a limited rocking motion of member 14 relative to the front plate and table 12. The limits of travel of member 14 will become apparent upon reference to FIGS. 5, 5A, 5B, and 5C, and from the following description.

Figure 2:
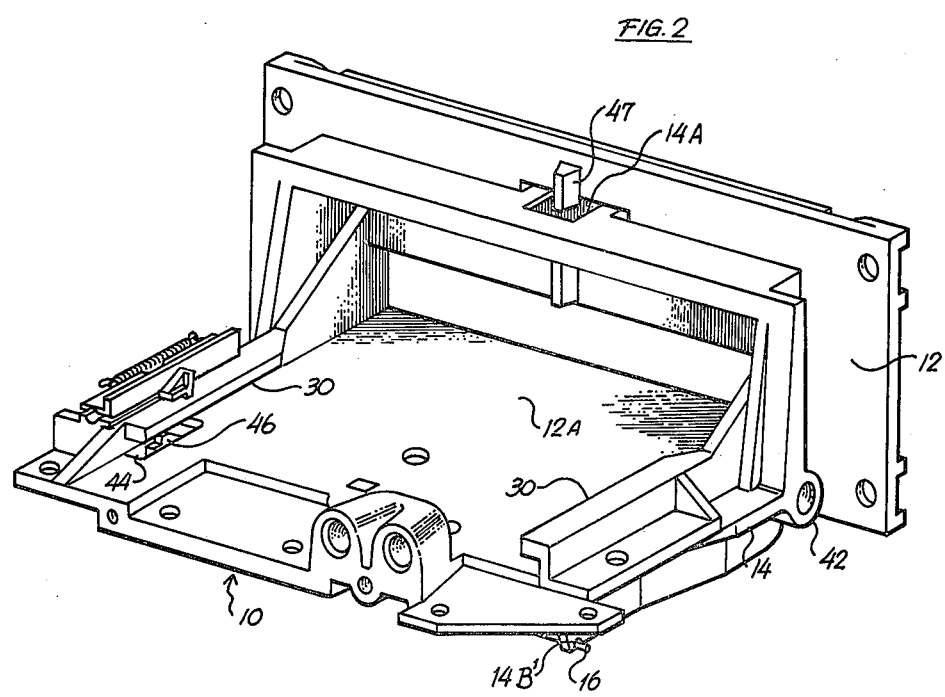
FIG. 2 is a rear perspective view of the cartridge receiving and locking mechanism of FIG. 1.

As may be seen upon reference to FIGS. 2 and 5, cut-out portions 44 of the table 12A permit the stops 46 positioned on the extremities of the rocker arm 14 to project into the tracks formed between the elongated guides 30 and corresponding portion of the table 12A. The undersurface 30A of each of the guides 30 provide an upper limit to the projection of the stops 46. As may be seen upon reference to FIG. 2, a projection 47, integrally molded onto the rear side of the front plate portion of member 12, projects into an opening 14A of the rocker arm 14 to thereby restrict the limit to which the release button 24 may be depressed. The portion of the stops 46 facing the mouth 20 of the front plate and table assembly 12 is slanted with respect to the table 12A such that when the cartridge 18 is inserted through the opening 20 and projected across the table 12A the forward edge of the cartridge 18 slides over the canted portion 46 of the rocker arm 14 causing the stop portion to be retracted below the surface of table 12A (See FIG. 5B).

The stops 46 normally project above the surface of the table 12A under the influence of the relatively straight biasing spring 16 (See FIGS. 5A & 5C). As may be seen from FIGS. 3 & 5, the biasing spring 16 bridges the gap separating the extremities 14B and 14B$^1$ of rocker arm 14 at a point just beneath the projecting stops 46. The biasing force of spring 16 is in turn established by reason of an eyelet 48, which projects from beneath the table 12A and through which the biasing spring 16 is threaded. In this manner there is established a biasing force which normally tends to project the stops 46 above the surface of the table 12A. In the absence of a magnetic cartridge, the stops 46 come to rest as they contact the underside of the guides 30 (See FIG. 5A). Upon depressing button 24, the rocker arm 14 pivots about projections 40 causing the stops 46 to be retracted beneath the level of the surface of table 12A.

The manner in which the simplified structure comprising the present invention operates to receive and lock a magnetic tape data cartridge will be apparent from the following explanation which accompanies the description of FIGS. 5A, 5B, and 5C.

FIG. 5A is a cross-sectional view taken along the line 5—5 of FIG. 4 prior to the time the cartridge 18 is inserted through the opening 20 of the front plate portion of member 12. At this time, as will be noted upon reference to FIG. 5, the stop 46 is biased upward into contact with the undersurface of the guide 30 under the influence of the biasing spring 16. At the same time, the release button 24 projects into the opening 22 of the front plate portion of member 12 without interference with projection 47 (See FIG. 4).

FIG. 5B shows the magnetic cartridge 18 as having been partially inserted into the cartridge receiving and locking mechanism comprising the present invention to the extent that the leading edge 18A of the cartridge 18 is shown as just riding over the stop 46 of the rocker arm assembly 14. Insertion of the cartridge 18 without interference of the stop 46 is facilitated by reason of the canted surface of the latter member. Thus, as the leading edge 18A of the magnetic cartridge comes into contact with the stop portion 46 of the rocker arm assembly 14, it moves readily to depress the latter against the biasing force of the spring 16, causing stop 46 to be in turn depressed beneath the surface of the table 12A.

As may be seen upon reference to FIG. 5C, when the magnetic cartridge 18 has been completely inserted through the opening 20 of the front plate portion of member 12, the leading edge 18A of the magnetic cartridge has likewise completed its traversal over the stop 46 so that the latter now projects into a notched portion 50 in the base plate of the magnetic cartridge 18. The magnetic cartridge 18 is now so positioned on the table 12A that the removal thereof is precluded until such time as the release button 24 is depressed causing the stops 46 to be retracted from the notched portion 50 of the magnetic cartridge to a level beneath the surface of the table 12A so as to facilitate removal of the magnetic cartridge.

Although the specification defines a cartridge receiving and locking mechanism of preferred design it will be appreciated that the invention is not limited thereto. Accordingly, any modifications, variations, or equivalent arrangement within the scope of the appended claims should be considered to be within the scope of the invention. Having thus described in detail my invention,

We claim:

1. A magnetic tape cartridge receiving and locking mechanism comprising but three relatively movable components, further comprising a table portion adapted to receive a magnetic tape cartridge, a front portion oriented relatively perpendicular with respect to said table portion, said front portion having an opening therein extending above the level of the table adapted to receive said magnetic tape cartridge, and means for locking said magnetic tape cartridge against relative movement after said magnetic cartridge has been inserted into said opening, said locking means comprising a rocker arm pivotally mounted for movement relative to said table and front portions, said rocker arm comprising generally the configuration of a bent U shaped member, said bend occurring approximately midway on each arm of said U shaped member proximate to pivot points for effecting said pivotal movement of said rocker arm relative to said table and front portions, said rocker arm further comprising a projection from the base of said U which projection functions as a push button, said push button cooperatively positioned so as to extend through a second opening in said front portion, stop means attached to the end of at least one arm of said U shaped member, said stop means capable of being projected through a cut-out portion in said table portion, biasing means comprising a relatively straight spring member operatively connected with respect to said rocker arm and said table portion so as to cause said stop means to normally project above the level of said table portion, whereby when a magnetic tape cartridge is inserted through the opening in said front portion and is projected therethrough so as to move onto and across said table portion the leading edge of said magnetic cartridge moves against said stop means of said rocker arm overcoming said spring member and causing said stop means to be depressed below the surface of said table portion and thereby permitting the magnetic tape cartridge to be further inserted into said cartridge receiving mechanism until cooperating openings on the underside of said magnetic tape cartridge become aligned with said stop means of said rocker arm at which time the biasing effect of said spring member causes said stop means attached to said end of at least one arm of said U shaped member to project into at least one of said cooperating openings on the underside of said magnetic cartridge tending to restrain further movement of said magnetic cartridge on said table until such time as said push button is depressed thereby retracting said stop means below the level of said table portion so as to permit the magnetic tape cartridge to be readily removed.

* * * * *